May 19, 1931.　　　J. R. DONALD　　　1,806,240
PRODUCTION OF CARBON DIOXIDE ICE
Filed Nov. 1, 1928　　2 Sheets-Sheet 1

JAMES RICHARDSON DONALD.
INVENTOR.
BY Marks & Clerk
ATTORNEYS.

JAMES RICHARDSON DONALD
INVENTOR.

Patented May 19, 1931

1,806,240

UNITED STATES PATENT OFFICE

JAMES RICHARDSON DONALD, OF MONTREAL, QUEBEC, CANADA

PRODUCTION OF CARBON DIOXIDE ICE

Application filed November 1, 1928. Serial No. 316,518.

This invention relates to the production of ice from carbon dioxide gas and has for its object the provision of a simple, economical process whereby a substantially dense ice is formed without the use of excessively high pressures.

In the processes heretofore used carbon dioxide gas is compressed at comparatively high pressures of approximately 60–100 or more atmospheres and cooled to liquefy the same, after which it is allowed to expand into a chamber with the formation of snow, which is then compressed to form a block. The ice so formed is made up of the compressed, finely divided particles of snow and is thus somewhat porous or granular in character.

In the present process the carbon dioxide gas is compressed and the temperature is reduced below that at which the gas is converted to the liquid phase at the pressure employed. The reduction of the temperature makes it possible to liquefy the gas at much lower pressures. This temperature varies with the pressure, some of the corresponding temperatures and pressures being substantially as follows:

| Temperature | Pressure |
|---|---|
| Plus 10° C. | 44 atmospheres |
| 0° C. | 35 atmospheres |
| Minus 10° C. | 26 atmospheres |
| Minus 30° C. | 13 atmospheres |
| Minus 50° C. | 7 atmospheres |
| Minus 65° C. | 4 atmospheres |

The pressure on the liquefied carbon dioxide is then released to allow the mass to boil and internally cool itself until the remaining portion of the liquid is directly converted to the solid form.

The accompanying drawings illustrate diagrammatically three forms of apparatus in which the process may be carried out.

Figure 1:
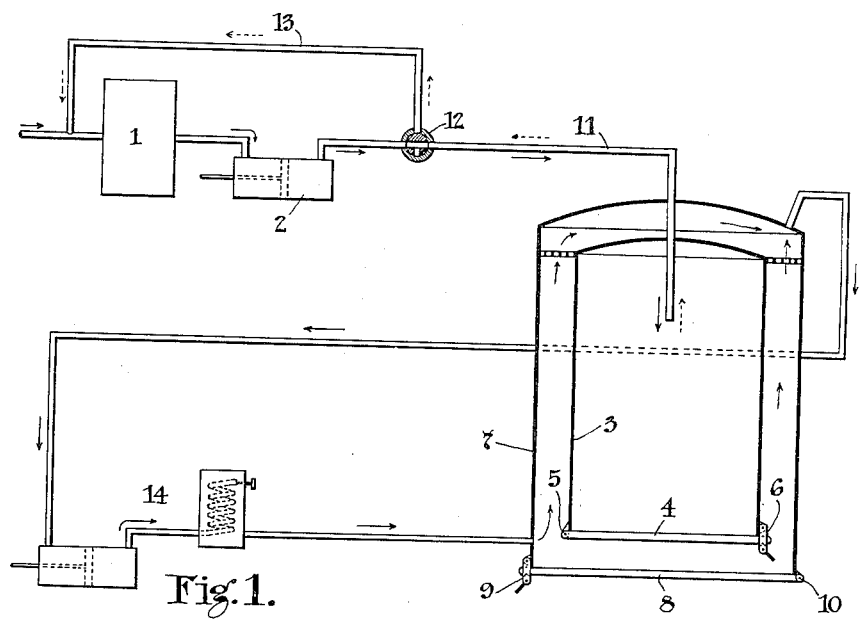
Figure 1 illustrates an apparatus in which the cooling is effected in the liquid chamber.

In the drawings, 1 represents a storage vessel for carbon dioxide, 2 a compressor connected therewith and discharging into a container 3. The latter has a removable bottom 4, illustrated as hinged at 5 and held tightly closed by a suitable device 6, and a spaced surrounding jacket 7 likewise provided with a readily removable bottom 8 hinged at 9 and securely closed at 10. In the pipe 11 is a two-way valve 12 to which is connected the pipe 13 which leads to the storage vessel 1. 14 represents any suitable device for circulating a refrigerant about the container 3.

In operation the $CO_2$ gas is compressed by means of the compressor 2 to, for example, 26 atmospheres, and at the same time the temperature in the chamber 3 is reduced to minus 10° C. by the circulation of a suitable refrigerant such as, for example, ammonia or cold air. This changes the gas to liquid. The valve 12 is then adjusted to disconnect the compressor and the reduction of pressure causes the liquid to expand and escape as gas into the storage tank, at the same time cooling the gas therein. This release of gas is continued until the remaining liquid has been cooled by expansion to the point of solidification. The valve 12 is then closed and the refrigerant removed when the closures 8 and 4 are opened to release the block of ice. A jet of air at room temperature or steam may be impinged momentarily upon the walls of the chamber 3 to readily release the block.

Figure 2:
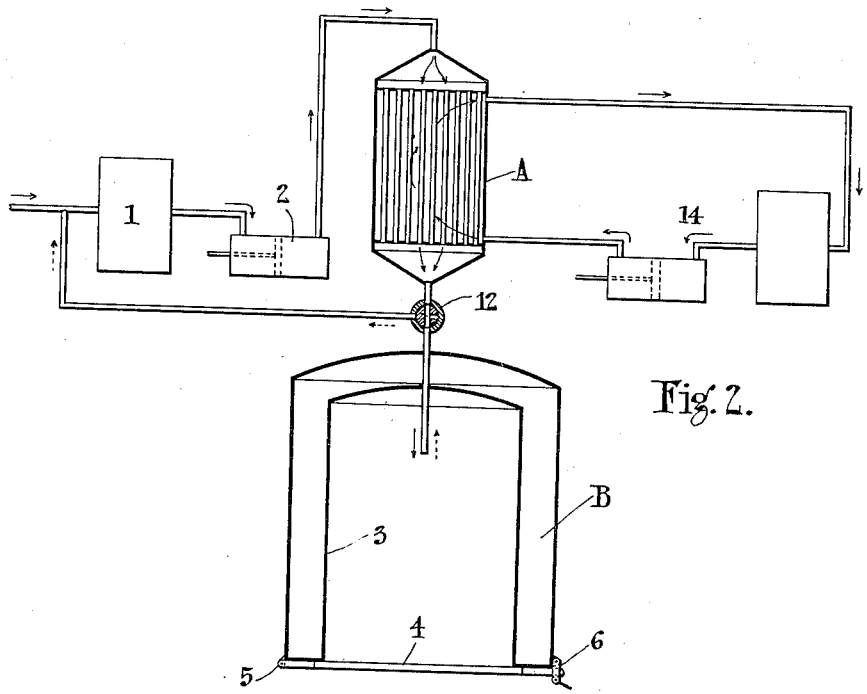
Figure 2 illustrates an apparatus in which an exchanger is employed.

In Figure 2, A is a heat exchanger connected with the compressor 2 and the refrigeration device 14 and discharging into the chamber 3, the walls of which are suitably insulated as by the vacuum chamber B. The two-way valve 12 is located in the discharge pipe from the exchanger and is likewise connected with the vessel 1.

In the operation of this device the $CO_2$ gas is subjected to a pressure of, say, 26 atmospheres and the temperature in the exchanger A is reduced to minus 10° C. by circulation of any suitable refrigerant, whereby the gas is liquefied and fills the chamber 3. The pressure is then released by adjusting the valve 12 as before and by internal cooling caused by the expansion the remaining liquid is solidified to form a substantially dense block of ice. The block is removed by opening the closure 4 as before.

The liquid carbon dioxide is thus converted directly to the solid producing a relatively compact mass by the application of moderate pressure.

Figure 3:
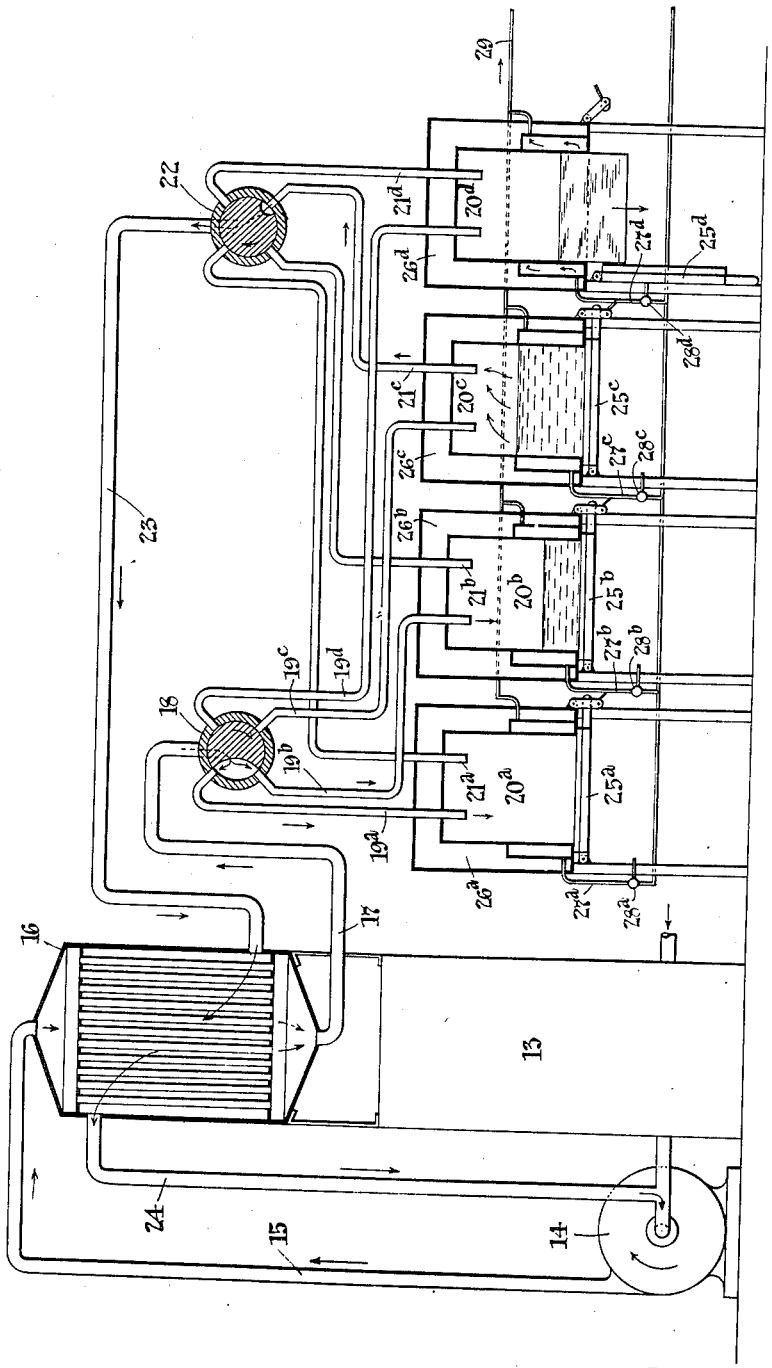
Figure 3 illustrates a larger form of apparatus.

In Figure 3 which shows an apparatus for employing the invention to produce solid $CO_2$ on a larger scale, 13 indicates a supply tank which is kept filled with $CO_2$ gas from any suitable source. The gas from tank 13 is forced by means of a pump or compressor 14 through a pipe 15 to a heat exchanger 16. The gas is cooled and liquefied by its passage through the tubes of the exchanger 16, and the liquefied gas flows by way of a pipe 17 to a distributing valve 18. In the illustrated position of valve 18 the liquid gas flows through pipes $19^a$ and $19^b$ to chambers $20^a$ and $20^b$. The valve 18 is also connected by pipes $19^c$ and $19^d$ to chambers $20^c$ and $20^d$ respectively. The chambers $20^a$ to $20^d$ are also respectively connected by pipes $21^a$, $21^b$, $21^c$ and $21^d$ to a four-way valve 22, the outlet of which is connected by a pipe 23 to the shell of the exchanger 16. The shell of the exchanger is also connected by a pipe 24 to the suction of the pump 4.

The open bottoms of chambers $20^a$ to $20^d$ are closed by any suitable hinged or removable covers $25^a$ to $25^d$ and are heat-insulated by any convenient means such as evacuated spaces $26^a$ to $26^d$.

In the position shown, chamber $20^a$ is just beginning to be filled with liquid $CO_2$. Chamber $20^b$ is half-filled. Chamber $20^c$ contains its full charge of liquid $CO_2$ and is just beginning to evaporate through pipe $21^c$. This evaporation causes the liquid in chamber $20^c$ to solidify, and the evaporated gas passes out through pipe $21^c$, valve 22, pipe 23 and in passing through the exchanger 16 cools and liquefies the incoming gas flowing through the exchanger tubes. The evaporated gas then leaves the exchanger and passes by way of the pipe 24 to the suction of the pump 14. Both valves 18 and 22 are closed with respect to chamber $20^d$, the cover $25^d$ is opened and the block of solid $CO_2$ is being removed.

When the block has been removed from chamber $20^d$ and the cover $25^d$ is closed, this chamber is ready to be refilled with liquid; chamber $20^c$ is ready to discharge its block of ice; chamber $20^b$ is filled with liquid and ready to expand, and chamber $20^a$ is half-filled with liquid, and these actions may be performed by rotating the valves one-quarter revolution in a clockwise direction. The operation is therefore cyclic and semi-automatic, and the apparatus forms a closed circuit so that waste of material is eliminated.

To facilitate removal of the solid $CO_2$ the lower parts of the ice chambers may be provided with jackets with which air or steam inlet pipes $27^a$ to $27^d$ communicate, these pipes being controlled by valves $28^a$ to $28^d$, the stems of which are in the path of movement of the covers $25^a$ to $25^d$ so that when a cover is opened air or steam is automatically admitted to the corresponding jacket. The air or steam leaves the jackets through pipes communicating with an outlet pipe 29.

It will be understood that the invention is not limited to any particular number of chambers 20, which number may be varied according to the desired capacity of the plant.

I claim:

1. A process of producing solid carbon dioxide which comprises compressing and cooling the gas to liquefy it, conveying the liquefied gas to a closed, heat-insulated chamber, simultaneously evaporating the liquefied gas in another previously filled heat-insulated chamber and employing the resulting gas to effect the first mentioned cooling, and simultaneously removing from another heat-insulated chamber a block of solidified carbon dioxide.

2. A process of producing solid carbon dioxide which comprises compressing and cooling the gas to liquefy it, filling certain of a series of heat-insulated chambers with said liquefied gas, expanding the liquefied gas contained in another, previously filled chamber of said series, removing a block of solidified carbon dioxide from another of said series of chambers, and successively and repeatedly performing said steps of filling, expanding and removing in each of the said chambers.

In testimony whereof I have affixed my signature.

J. R. DONALD.